United States Patent
Okazaki et al.

(10) Patent No.: US 6,617,045 B2
(45) Date of Patent: Sep. 9, 2003

(54) METALLIC CARRIER, FOR AUTOMOBILE EXHAUST GAS PURIFICATION, MADE OF THIN METAL FOIL AND METHOD OF PRODUCING THE SAME

(75) Inventors: Yuichi Okazaki, Tokai (JP); Masayuki Kasuya, Tokai (JP); Takuzo Kako, Tokai (JP); Mikio Yamanaka, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 10/300,418

(22) Filed: Nov. 20, 2002

(65) Prior Publication Data

US 2003/0152794 A1 Aug. 14, 2003

Related U.S. Application Data

(63) Continuation-in-part of application No. 09/798,146, filed on Mar. 2, 2001, now abandoned.

(51) Int. Cl.$^7$ ................................................ B32B 3/12
(52) U.S. Cl. ...................... 428/593; 428/594; 428/599; 228/181
(58) Field of Search ................................ 428/593, 603, 428/925, 926, 685, 680, 599, 598, 594; 228/181, 248.1

(56) References Cited

U.S. PATENT DOCUMENTS

| | | | |
|---|---|---|---|
| 3,188,203 A | 6/1965 | Peaslee et al. | 75/170 |
| 4,602,001 A | 7/1986 | Cyron | 502/439 |
| 4,752,599 A | 6/1988 | Nakamura et al. | 502/257 |
| 5,618,498 A | 4/1997 | Konya et al. | 422/174 |
| 5,648,176 A | 7/1997 | Nakagawa et al. | 428/593 |
| 2002/0022145 A1 | 2/2002 | Wieres et al. | 428/598 |

FOREIGN PATENT DOCUMENTS

| | | |
|---|---|---|
| DE | 19903184 A1 | 8/2000 |
| JP | 62-269750 | 11/1987 |
| JP | 62-282644 | 12/1987 |
| JP | 64-58350 | 3/1989 |
| JP | 2-261518 | 10/1990 |
| JP | 6-210186 | 8/1994 |
| JP | 2000-279763 | 10/2000 |

Primary Examiner—John J. Zimmerman
(74) Attorney, Agent, or Firm—Kenyon & Kenyon

(57) ABSTRACT

A metallic carrier for automobile exhaust gas purification made of thin metal foil includes a honeycomb unit composed of 8–25 μm thick corrugated metal foil and flat metal foil joined by solder joints not fewer than 70% of which have a thickness of at least 1.5 times and not greater than 4 times the foil thickness. A method of producing the metal carrier includes a step of forming a honeycomb unit in which 8–25 μm thick corrugated metal foil and flat metal foil are joined by solder joints using a solder powder, the solder powder having a particle diameter not greater than 4.5 times the thickness of the metal foil constituting the honeycomb unit.

7 Claims, 1 Drawing Sheet

METALLIC CARRIER, FOR AUTOMOBILE EXHAUST GAS PURIFICATION, MADE OF THIN METAL FOIL AND METHOD OF PRODUCING THE SAME

This is a continuation-in-part of prior application Ser. No. 09/798,146 filed Mar. 2, 2001 now abandoned. The disclosure of the specification, claims, abstract and drawings of application Ser. No. 09/798,146 is incorporated herein by reference.

BACKGROUND OF THE INVENTION

1. Field of the Invention

This invention relates a metallic carrier for a catalytic converter used to purify automobile exhaust gas and a method of producing the same and, particularly, to a metallic carrier made of thin metal foil and a method of producing the same.

2. Description of the Related Art

Restrictions on automobile exhaust emissions have been made increasingly stringent in recent years owing to the progressive severity of global air pollution. The most effective of the various technologies developed to comply with the strict regulations have been those that rapidly ramp up the purification performance of the exhaust gas purification catalyst at the time of cold engine start. Considerable effort has, for instance, gone into the development of EHC (electrically heated catalyst) systems that elevate catalyst temperature using electric energy, ways for lowering reaction start temperature by boosting catalyst activity, and techniques for bringing the catalyst up to its active temperature in the shortest time possible by using a metal carrier of relatively small heat capacity and reducing the thickness of the metal foil forming the honeycomb. Among these, EHC has not yet been put into practical use owing to structural complexity that gives rise to problems regarding durability under rapid temperature increases/decreases. On the other hand, increasing the activity of a catalyst at low temperature encounters the drawback of accelerating metal particle sintering at higher temperatures.

In the case of reducing metal foil thickness to lower the heat capacity of the metallic carrier, the solder material component at the solder joints increases relative to the foil material. This lowers the melting point of the solder joints and makes them susceptible to fusing damage under abnormally high temperature owing to engine misfires. Moreover, when the thickness of the metal foil is reduced, the oxidation resistance of the honeycomb is degraded because the absolute amount of Al retained by the foil decreases and also because of the relative increase in the solder material component at the solder joints. In the case of the conventionally used 20Cr-5Al foil, this drawback appears when the foil thickness becomes 25 $\mu$m or less.

The metal foil honeycomb component of the metallic carrier is most often constituted of a corrugated foil and a flat foil joined by Ni solder. In order to ensure the heat resistance of the solder joints, B-Ni5 (center composition: 20Cr-10Si-bal. Ni) is generally used. The solidus of this solder is 1,060° C., while that of the 20 Cr-5 Al foil generally used as the metal foil is 1,510° C. The solder joints are formed by fusion or mutual diffusion of the metal components of the solder and foil. The fusion of the solder joints starts between the solidus of the solder and the foil. However, when the solder material component of the solder joints increases relative to the foil material component thereof, the fusion starts at a lower temperature closer to that of the solder (1,060° C.).

As explained earlier, an effort has been made to reduce the thickness of the metal foil of the metallic carrier to the very minimum. When the foil thickness is made thin, however, the solder material component of the solder joints increases relative to the foil material component thereof to lower the fusion temperature. Moreover, the Al content of the solder joints decreases to degrade its oxidation resistance. The highest temperature of a metallic carrier experiences is ordinarily around 1,000° C. It may, however, be increased to a temperature of around 1,200° C. on rare occasions when one cylinder of the engine misfires to allow raw gas to flow to and burn at the metallic carrier. Although the metallic carrier would be heated to a still higher temperature if two cylinders should misfire, the probability of this happening is very low. From a practical viewpoint, therefore, the metallic carrier is required to be capable of withstanding fusing damage at its solder joints up to a temperature of 1,200° C.

When a metal honeycomb of a foil thickness of 25 $\mu$m or less is soldered by a conventional method, however, the proportion of the solder joints accounted for by the solder material component is large and many of the solder joints incur fusing damage and become unusable at 1,180° C. In addition, the oxidation tests of 1,050° C.×200 hr in air showed that the oxidation resistance of the solder joints declined to the point that abnormal oxidation occurred centering on foil portions adjacent to some of the solder joints.

U.S. Patent Application Publication No. US 2002/0022145 A1 discloses a technology where the ratio of the mass of the foils contacting a brazing joint to that of the brazing medium should be limited between 4 and 8 in the case of using a foil thinner than 40 $\mu$m. However, the total amount of brazing powder applied to a honeycomb has to be limited to a very small amount in order to meet the requirements of this technology. This results in not a few joints which fail to be brazed, even if a small size of brazing powder defined by the above U.S. Patent Application Publication is used. Thus, the present inventors found that these honeycombs do not have sufficient strength to endure an engine bench test.

The present invention was accomplished in light of the foregoing points and has as its object to provide a metallic carrier for automobile exhaust gas purification made of thin metal foil that is improved in fusing damage resistance and oxidation resistance and exhibits excellent durability.

SUMMARY OF THE INVENTION

In order to achieve this object, the present invention provides a metallic carrier for automobile exhaust gas purification made of a thin metal foil comprising a honeycomb unit composed of a 8–25 $\mu$m thick corrugated metal foil and a similar flat metal foil joined by solder joints, wherein solder joints having a thickness of at least 1.5 times and not greater than 4 times the foil thickness account for not fewer than 70% of all solder joints between the two foils. The metal foils are preferably stainless steel foils containing, in percentage by weight, greater than 6.5% to 10% of Al. The invention further provides a method of producing a metallic carrier for automobile exhaust gas purification made of thin metal foil, which method comprises a step of forming a honeycomb unit in which a 8–25 $\mu$m thick corrugated metal foil and a similar flat metal foil are joined by solder joints using a solder powder, the solder powder having a particle diameter not greater than 4.5 times the thickness of the metal foil constituting the honeycomb unit. The metal foils used in this method can be preferably produced by rolling stainless steel enriched in Al by cladding or plating, winding the rolled stainless steel into a coil, and vacuum-annealing the stainless steel in the as-coiled condition to diffuse Al therein. Otherwise the metal honeycomb soldered using the solder powder are preferably enriched in Al by cementation to have an Al content, in percentage by weight, of greater than 6.5% to 10%.

DESCRIPTION OF THE PREFERRED EMBODIMENT

Figure 1:
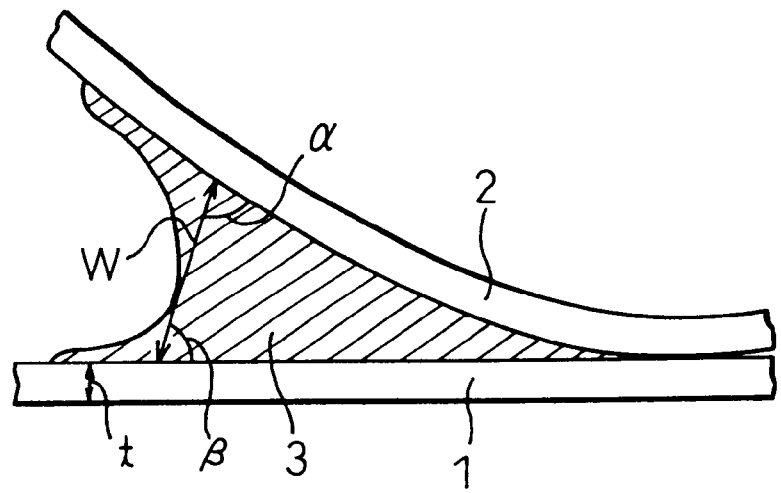
FIG. 1 is a diagram showing how the ratio between maximum solder thickness and foil thickness of a honeycomb solder joint is defined.

An embodiment of the present invention will now be explained with reference to the drawings. FIG. 1 is an enlarged sectional view showing one of numerous solder joints between a corrugated foil and a flat foil of a metallic carrier according to the present invention. A flat foil 1 and a corrugated foil 2 are joined at each joint portion by a solder joint 3. More specifically, the flat foil 1 and the corrugated foil 2 are superimposed, rolled into a spiral, and soldered together at their contact regions to form a cylindrical honeycomb.

Figure 2:
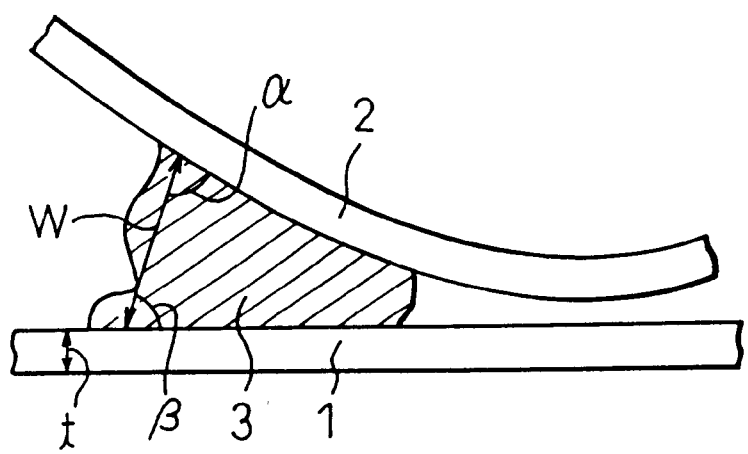
FIG. 2 is a diagram showing how the maximum thickness of a solder joint is defined in the case where a flat foil and a corrugated foil are spaced apart.

In the present invention, the flat foil and corrugated foil are 8–25 μm thick metal foils and the maximum thickness of the solder joint 3 is defined such that not fewer than 70% of all solder joints 3 have a thickness of at least 1.5 times and not greater than 4 times the foil thickness. The maximum thickness of the solder is defined as the thickness w in FIG. 1. Specifically, it is defined as the length of the line passing through the most inwardly indented point on the line defining the exposed solder surface side of the solder joint 3 between the two metal foils and making substantially equal interior angles and β with the solder surface sides of the flat foil 1 and corrugated foil 2. The gist of the invention resides in that not fewer than 70% of all solder joints have a thickness w of at least 1.5 times and not greater than 4 times the thickness of the foils 1 and 2. Formation of such solder joints can be achieved by conducting the soldering using a solder powder whose maximum particle diameter is limited to not greater than 4.5 times the foil thickness, and the width of the binder applied on the top of the corrugated foils and the total amount of solder powder supplied to the honeycomb body are strictly controlled. When the flat foil 1 and corrugated foil 2 joined by the solder joints 3 are in a spaced-apart condition as shown in FIG. 2, two lines of differing length can be drawn to connect the foils and the end of the solder. In this case, the maximum thickness is defined as the length w of the longer line.

A stainless steel foil having an Al content in percentage by weight of greater than 6.5% to 10% is difficult to mass produce by an ordinary rolling method and is therefore produced by Al-enriching a base material of 20Cr-5Al or the like by subjecting it to Al plating, cladding or cementation. Otherwise a metal carrier of improved high-temperature strength, a property that has been difficult to achieve in a thin foil honeycomb, can be obtained by using as the base material an Fe-base superalloy such as NCF800 (20Cr-32Ni-0.4Al) or a Ni-base superalloy such as NCF601 (23Cr-1Al-bal. Ni). Moreover, after the honeycomb has been formed by soldering together 8–25 μm thick corrugated and flat metal foils, of one of the foregoing compositions, by use of a solder powder whose maximum particle diameter is not greater than 4.5 times the foil thickness, Al-enrichment can be conducted by cementation to obtain solder joints and surrounding portions having a high Al content of greater than 6.5%o to 10% such as that of the foil base metal.

The reason for the numerical limitations in the present invention will now be explained. First, regarding the maximum thickness of the solder of the solder joints, the present invention requires that not fewer than 70% of all solder joints must have a solder thickness of at least 1.5 times and not greater than 4 times the foil thickness. The lower limitation is set because those joints having a thickness smaller than 1.5 times the foil thickness essentially do not contribute to the strength of the honeycomb unit. Since the metal structure of these joints is ferritic (b.c.c) containing some amount of Ni and Al, the joints are very brittle. The reason for the upper limitation is that since a solder joint whose maximum solder thickness is not greater than 4 times the foil thickness does not fuse below 1,200° C., except at very local and low melting-point portions, the limitation ensures retention of the strength of the solder joint overall. The reason for stipulating that it suffices for at least 70% of the solder joints to meet this requirement is that even if the remaining fewer than 30% of the solder joints should melt during misfiring, the honeycomb will still be able to maintain its form and no disintegration of the honeycomb unit will occur over a short time period.

In the second aspect of the invention, the Al content of the metal foil is defined as greater than 6.5% to 10%. The reason for this limitation is that when the Al content is 6.5% or less, good oxidation resistance cannot be obtained in a thin foil of 8–25 μm thickness, and when the Al content exceeds 10%, the foil becomes incapable of enduring severe thermal fatigue owing to an increased thermal expansion and an increased brittleness. In addition to Al, the metal foil contains 15–26% of Cr and 0.02–0.15% of one or more of rare earth elements including Y. It is worth noting that when the aforesaid clad foil or plated foil with adhered Al was diffusion-annealed in a vacuum furnace, the foil could be heat treated in a coiled form without any sticking even when it was not coated with an anti seize agent.

In the third aspect of the invention, the particle diameter of the solder powder used is defined as not greater than 4.5 times the foil thickness. This is because restricting the particle diameter of the solder powder in this manner ensures that not fewer than 70% of all solder joints have a solder thickness of greater than 1.5 times and not greater than 4 times the foil thickness. With respect to the solder powder having heat resistance used for soldering, B-Ni5 type solder is suitable. However, the heat treatment temperature for soldering can be lowered by using a solder containing in terms of wt%, Cr: 15–20%, Si: 9–13%, P: 1–5% and the reminder Ni and unavoidable impurities. This soldering powder is known from U.S. Pat. No. 3,188,203.

However, the present inventors found that a smaller powder whose diameter is less than 4 times the foil thickness forms solder joints which have a higher melting temperature. The reason is that the contacting area of the solder metal with foils is large as a result of its high fluidity at high temperature, a much greater amount of Al diffuses from the foils toward the solder metal and Ni-Al inter-metallic compounds with a higher melting temperature precipitate. In this case, it is preferable that solder joints having a thickness of at least 1.5 times and not greater than 3.5 times the foil thickness account for not fewer than 70% of solder joints between the two foils.

The above mentioned metallic carrier will be produced by the following production method, as a preferable embodiment; such as, an adhesive or binder is coated in advance to the area to be soldered of a honeycomb body constituted by the corrugated foil and the flat foil, and the honeycomb body is inclined to a direction of a gas flow and then the solder powder forcefully blown from a nozzle in combination with compressed air to the top portion of the honeycomb body which is rotating, and the resultant honeycomb body is heat treated in vacuum. When the solder powder with a smaller particle diameter is sprinkled over a honeycomb, the powder tends to stick mainly to the top of the honeycomb, and thus in the above method, use of compressed air is necessary to make the fine powder penetrate into the honeycomb.

EXAMPLE 1

Both surfaces of 300 $\mu$m 20Cr-5Al sheets were clad with 30 $\mu$m, 20 $\mu$m, 15 $\mu$m or 10 $\mu$m Al foils by strong reduction. The clad foils were rolled into 15 $\mu$m foils of an Al-SUS-Al structure. The four types of clad foil were degreased, coiled, placed in a vacuum furnace in the as-coiled condition, and heat treated at 1,000° C. for 30 min. Although the foils were not coated with an anti sieze agent, no foil-to-foil sticking occurred. Separately, a 50 $\mu$m 20Cr-5Al foil was further rolled to obtain a 15 $\mu$m foil. The Al contents of the foils determined by chemical analysis are shown in Table 1. The values for all foils other than the 20Cr-5Al foil are somewhat lower than those predicted by calculation. The 11% Al foil of No. E in Table 1 is the result of an attempt to roll the foils down to 10 $\mu$m. The foil broke and a 10 $\mu$m foil could not be obtained.

TABLE 1

| No. | Clad sheet 20Cr—5Al thickness | Clad sheet Al thickness | Al content of 15 $\mu$m foil by chemical analysis (%) | Condition after continuous high-temperature engine test | Residual Al after test (%) |
| --- | --- | --- | --- | --- | --- |
| A | 200 $\mu$m | — | 5.1 | Broad bean-sized dropouts | −0 |
| B | " | 10 $\mu$m | 6.9 | Normal | 1.5–1.7 |
| C | " | 15 $\mu$m | 8.1 | Normal | 1.9–2.3 |
| D | " | 20 $\mu$m | 9.2 | Normal | 4.2–4.5 |
| E | " | 20 $\mu$m | 11.0 | Normal | 6.1–5.4 |

Next, five different kinds of B-Ni type solder powder were sifted through screens of different mesh to prepare six different kinds of solder powder: under 106 $\mu$m, under 90 $\mu$m, under 75 $\mu$m, under 63 $\mu$m, under 53 $\mu$m and under 45 $\mu$m. Part of the 15 $\mu$m No. C foil of Table 1 was corrugated, a binder was applied to the crowns of the corrugated foil, the corrugated foil was superimposed on a flat foil and the two foils were rolled into a coil to obtain a 100 mm diameter cylindrical honeycomb unit. Twelve honeycomb units were fabricated in this manner. Each honeycomb unit was inserted into an outer cylinder made of 1.5 mm stainless steel sheet and was then sprinkled with one of the 6 kinds of solder powder. After excess solder powder had been removed with an air blower, soldering was conducted by 1,180° C. vacuum treatment. Two honeycomb units were fabricated using the solder powder of each particle size. One of the honeycomb units fabricated with each solder powder was cut into several pieces some of which were directly subjected to embedded polishing and examined for shape of the solder joints. The other was subjected to a fusing damage test at 1,200° C. for 10 min in air and quenched with air below to freeze the high-temperature structure. The so-obtained test pieces were subjected to embedded polishing and etching. The metallurgical structure of the solder joints was then examined. Twenty-five joints of each as-soldered honeycomb were photographed and the solder joint thickness ratios (maximum solder thickness/foil thickness) were determined. The photographs were then divided into those whose ratios were between 1.5 and 4 and those whose ratios were out of this range. The numbers of both groups are shown in Table 2. It will be noted that in the honeycombs fabricated using the under 63 $\mu$m, under 53 $\mu$m and under 45 $\mu$m solder powders, the percentage of the solder joints having the ratios (maximum solder thickness/foil thickness) between 1.5 and 4 was seventy or greater, i.e., fell within the range stipulated by the present invention. In contrast, in the honeycombs fabricated using the under 106 $\mu$m, under 90 $\mu$m and under 75 $\mu$m solder powders, the percentage of the solder joints having the ratios between 1.5 and 4 did not reach seventy, i.e., fell outside the invention range.

TABLE 2

| Solder powder particle size | Number of joints with $1.5 \leq$ w/t $\leq 4$ | Number of joints with w/t < 1.5 or w/t > 4 | Percentage of joints with $1.5 \leq$ w/t $\leq 4$ (%) | |
| --- | --- | --- | --- | --- |
| 106 $\mu$m | 5 | 20 | 20 | (Comparison) |
| 90 $\mu$m | 8 | 17 | 32 | " |
| 75 $\mu$m | 12 | 13 | 48 | " |
| 63 $\mu$m | 19 | 6 | 76 | (Invention) |
| 53 $\mu$m | 19 | 6 | 76 | " |

TABLE 2-continued

| Solder powder particle size | Number of joints with $1.5 \leq$ w/t $\leq 4$ | Number of joints with w/t < 1.5 or w/t > 4 | Percentage of joints with $1.5 \leq$ w/t $\leq 4$ (%) | |
| --- | --- | --- | --- | --- |
| 45 $\mu$m | 20 | 5 | 80 | " | w/t : max. solder thickness/foil thickness

Honeycomb samples measuring 20×20×10 mm (W×L×T) were cut from the individual honeycombs and heated in air at 1,200° C. for 10 min. Upon removal from the furnace, the samples were quenched with air below to freeze the high-temperature structure. After being embedded, polished and etched, the honeycomb samples were examined for the metallurgical structure of their solder joints. In the honeycomb samples soldered using the under 106 $\mu$m, under 90 $\mu$m and under 75 $\mu$m solder powders, many solder joints had a metallurgical structure wherein dendrite structure was observed for many joints to be distributed all over the solder joints including both sides of foil attached to the solder metal, indicating that these solder joints had melted almost entirely. Such joints accounted for more than 30% of the observed solder joints. In contrast, in the honeycomb samples soldered using the under 63 µm, under 53 µm and under 45 µm solder powders, dendrite structure was observed but was small in size throughout and distributed mainly within the solder metal. Solder joints in which the dendrite structure penetrated the foil accounted for fewer than 30% of the observed solder joints.

EXAMPLE 2

Honeycombs were fabricated of 15 µm foil using the different particle-size solder powders of Example 1. The honeycombs soldered using the under 90 µm and under 53 µm solder powders were applied with a wash coat composed mainly of $\gamma Al_2O_3$ and the coated honeycombs were used as carriers for a noble metal catalyst. Cones and flanges were welded to the opposite ends of outer cylinders encasing the honeycombs and the resulting units were subjected to a bench test with a 4-cylinder, 2,000 cc engine. The bench test consisted of five repetitions of a thermal cycle in which the engine was continuously operated for 10 minutes at 6,000 rpm with the full throttle and was then stopped for a cooling period of 20 minutes. One cylinder was made to misfire during the last minute of each 10 minute high-speed operation period of each cycle. The honeycomb temperature was 940–960° C. toward the latter part of 9 minutes of high-speed operation but rose to 1,230° C. during the final minute. As a result, about two-thirds of the central portion of the honeycomb soldered using the under 90 µm solder powder had protruded and clogged the cone on the downstream side of the exhaust gas flow after the third cycle. The test was therefore discontinued at the end of the third cycle. On the other hand, the honeycomb soldered using the under 53 µm solder powder did not break up even after five cycles.

EXAMPLE 3

Metal carriers fabricated in the manner of Example 2 using the 15 µm foils of Nos. A to E in Table 1 were pregnant with catalyst and subjected to an engine bench test. The honeycombs were soldered using the under 53 µm solder powder. The bench test consisted of operating the engine at 6,000 rpm with the full throttle so that the temperature inside the honeycomb became 1,000–1,050° C. The engine was not deliberately made to misfire. The engine was continuously operated at high speed for a total of 200 hours, except that it was stopped once every several hours for inspection and maintenance. The results are also shown in Table 1. The honeycomb made using the No. A foil turned black at the gas inlet end and was missing portions about the size of broad beans. No damages were observed in the honeycombs using the other foils. Samples cut from near the center of the inlet side of these honeycombs were subjected to embedded polishing and analyzed by EPMA to determine the amount of residual Al. The results are also shown in Table 1. It will be noted that the No. A honeycomb had substantially zero residual Al, which means all the Al in the foils was exhausted by high temperature oxidation. The fact that the others had significant amounts of residual Al is verification that they retained enough oxidation resistance to endure the continuous high temperature test in spite of using thin foil of 15 µm.

EXAMPLE 4

NCF800 (20Cr-32Ni) sheet was repeatedly rolled and vacuum-annealed to produce 13 µm foil. Part of the foil was corrugated, and a binder was applied to some of the crowns of the corrugated foil. The corrugated foil was superimposed on a flat foil and the two foils were wound into a coil to obtain a 100 mm diameter cylindrical honeycomb unit. The honeycomb unit was inserted into an outer cylinder made of stainless steel sheet and was then sprinkled with five different kinds of B-Ni5 type solder powder of under 53 µm particle size. After excess solder powder had been removed with an air blower, soldering was conducted by vacuum heat treatment. Then the honeycomb unit was buried in a mixed powder of aluminum chloride, Al powder, Cr powder and the like, and heat treated at 900° C. for 10 hr aiming the cementation of Al with the increase of the honeycomb foil thickness to about 15 µm. A portion of the treated honeycomb was excised and examined for average composition. It was found to be 19Cr-30Ni-7.6Al. The honeycomb was wash coated and pregnant with a noble metal catalyst. It was then subjected to the engine misfire test of Example 2 and the engine continuous high-temperature test of Example 3. The results were excellent, with no particular disintegration of the honeycomb being noted.

EXAMPLE 5

A flat 20Cr-5Al foil of 20 µm in thickness and a corrugated foil which was corrugated from the above-mentioned foil, were superimposed and wound to form a honeycomb unit of 77 mmφ (diameter)×105 mm (height). This was inserted into an outer cylinder of 80 mmφ (diameter)×115 mm (height) made of 19 Cr stainless steel. When the foils were wound to form the honeycomb unit, binder material for sticking solder powder was applied to predetermined locations.

Then, solder powder of high phosphorus content (in weight %, Cr: 15–20%, Si: 9–13%, P: 1–5%, Bal. Ni and unavoidable impurities) was sifted through screens of different mesh to prepare six different kinds of solder powder having different particle size: under 106 µm, under 90 µm, under 75 µm, under 63 µm, under 53 µm, and under 45 µm.

These powders were sprinkled from the upper end of each honeycomb unit that was inserted into the above-mentioned outer cylinder. In the case of solder powder sifted through a screen of finer mesh, clogging tended to occur in the upper end of the honeycomb unit. Particularly, fine solder powder floated like smoke and did not enter the honeycomb unit sufficiently. Then, solder powder was mixed with compressed air and forcedly discharged through a nozzle. The honeycomb unit was rotated with the central axis inclined at about 30 degrees relative to the air stream to enable the solder powder to be deposited at the locations to be soldered.

Next, vacuum processing was performed at 1090° C.×20 minutes. After the brazing processing was completed, a sample was cut from each honeycomb unit and subjected to embedded polishing to study the shape of the solder joints of each honeycomb unit. The study was conducted on about 30 solder joints per sample to measure the thickness of the solder joint w as shown in FIG. 1, and to classify the joints by the ratio of w to the foil thickness t into three groups with the ratio of w/t less than 1.5, more than 3.5, and from 1.5 to 3.5, and the number of joints in each group was counted. The results obtained on honeycomb units on which solder powder of high phosphorus content was sprinkled are shown in Table 3.

As can be seen from Table 3, when solder powder of high phosphorus content is used, w of the solder joints is generally small. For solder powder of high phosphorus content, when solder powder of size under 75 µm was used, the proportion of solder joints with w/t≦3.5 is already over 70%.

TABLE 3

| Solder powder particle size | Number of joints with 1.5 ≦ w/t ≦ 3.5 | Number of joints with w/t < 1.5 or w/t > 3.5 | Proportion of joints with 1.5 ≦ w/t ≦ 3.5 (%) |
|---|---|---|---|
| under 106 μm | 10 | 20 | 33 (comparison) |
| under 90 μm | 16 | 14 | 53 (comparison) |
| under 75 μm | 22 | 9 | 71 (invention) |
| under 63 μm | 21 | 9 | 70 (invention) |
| under 53 μm | 24 | 8 | 75 (invention) |
| under 45 μm | 24 | 9 | 73 (invention) |

Further testing was performed with honeycomb samples of 20 square×10 mm cut out from a solder joint of each honeycomb unit on which solder powder of high phosphorous content was used, by heating at 1200° C.×10 minutes in an atmosphere simulating misfiring of a engine and then extracting the sample from the furnace to freeze the metallographic structure at high temperature by forced rapid cooling in air.

After these samples were subjected to embedded polishing, etching was performed and the metallographic structure was observed to estimate the fused state of the solder joints at 1200° C. As a result, it was found that, in solder joints which used the under 106 μm and under 90 μm solder powder, in 30% or more of the solder joints, the dendrite structure which is an evidence of fusion and resolidification was seen from the center of the solder joint to penetrate the foil material and to extend to the foil surface on the opposite side of the solder joint. On the other hand, in solder joints which used the under 75 μm, under 63 μm, under 53 μm, and under 45 μm solder powder, the dendrite structure was generally small, and the proportion of the solder joints in which the dendrite structure penetrated the foil material was less than 30% even in solder joints using the under 75 μm solder powder. This proportion was even smaller for solder joints using the under 63, 53 and 45 μm solder powder.

As explained in the foregoing, the foil of the metallic carrier according to the present invention is very thin. Therefore, the back pressure produced when engine exhaust gas passes through the metallic carrier is low. In addition, the temperature of the metallic carrier rises rapidly after a cold start. Since the period up to activation of the catalyst is therefore short, the metal carrier helps to save expensive noble metal catalyst. Further, as explained with regard to the Examples, the melting damage resistance of the solder joints and the oxidation resistance of the honeycomb are excellent. The metallic carrier is capable of standing up to harsh engine durability testing. Moreover, the production method according to the present invention enables manufacture of such superior metallic carriers with high efficiency.

What is claimed is:

1. A metallic carrier for automobile exhaust gas purification made of thin metal foil comprising:
   a honeycomb unit composed of 8–25 μm thick corrugated metal foil and flat metal foil joined by solder joints, wherein solder joints having a thickness of at least 1.5 times and not greater than 4 times the foil thickness account for not fewer than 70% of all solder joints between the two foils.

2. A metallic carrier for automobile exhaust gas purification according to claim 1, wherein the metal foils are stainless steel foils containing, in percentage by weight, greater than 6.5% to 10% of Al.

3. A metallic carrier for automobile exhaust gas purification according to claim 2, wherein the metal foils are produced by enriching in Al by cladding or plating.

4. A metallic carrier for automobile exhaust gas purification according to claim 1 or 2, wherein the solder joints are formed by using a solder powder having a particle diameter of not greater than 4.5 times the thickness of the metal foils.

5. A metallic carrier for automobile exhaust gas purification according to claim 1 or 2, wherein the metal foils are enriched in Al by cementation to have an Al content, in percentage by weight, of greater than 6.5 to 10%.

6. A metallic carrier for automobile exhaust gas purification made of thin foil comprising: a honeycomb unit composed of 8–25 μm thick corrugated metal foil and flat metal foil joined by solder joints, wherein solder joints having a thickness of at least 1.5 times and not greater than 3.5 times the foil thickness account for not fewer than 70% of solder joints between the two foils and the solder joints are formed by using solder powder with a particle diameter of not greater than 4 times of the foil thickness and containing, in terms of wt %, Cr: 15–20%, Si: 9–13%, P: 1–5% and the remainder Ni and unavoidable impurities.

7. A metallic carrier for automobile exhaust gas purification according to claim 1, 2, 3, or 6, wherein the metallic carrier is produced by the steps comprising;
   coating adhesive or binder in advance to the area to be soldered of a honeycomb body constituted by the corrugated foil and the flat foil,
   inclining he honeycomb body to a direction of a gas flow, blowing forcefully the solder powder from a nozzle in combination with compressed air to the top portion of the honeycomb body which is rotating, and,
   heat treating the resultant honeycomb body.

* * * * *